United States Patent
Pathikonda et al.

(10) Patent No.: US 10,608,924 B2
(45) Date of Patent: Mar. 31, 2020

(54) METHODS AND APPARATUSES FOR NON-BLOCKING IP MULTICAST DELIVERY OF MEDIA DATA IN A MULTI-SPINE NETWORK

(71) Applicant: Cisco Technology, Inc., San Jose, CA (US)

(72) Inventors: Padmanab Pathikonda, Dublin, CA (US); Rishi Chhibber, Dublin, CA (US); Roshan Lal, San Jose, CA (US); Ann Roshini Paul, San Jose, CA (US); Anand Kumar Singh, Cupertino, CA (US); Nataraj Batchu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/042,870

(22) Filed: Jul. 23, 2018

(65) Prior Publication Data

US 2020/0028774 A1 Jan. 23, 2020

(51) Int. Cl.
*H04L 12/761* (2013.01)
*H04L 12/753* (2013.01)

(52) U.S. Cl.
CPC .............. *H04L 45/16* (2013.01); *H04L 45/48* (2013.01)

(58) Field of Classification Search
CPC ...................................................... H04L 45/16
USPC ....................................................... 370/390
See application file for complete search history.

(56) References Cited

U.S. PATENT DOCUMENTS

| 9,137,119 | B2 | 9/2015 | Yang et al. | |
| 9,584,397 | B2 | 2/2017 | Ghanwani et al. | |
| 9,654,385 | B2 | 5/2017 | Chu et al. | |
| 9,807,035 | B1* | 10/2017 | Hanks | H04L 49/25 |
| 2014/0254590 | A1* | 9/2014 | Yang | H04L 12/18 370/390 |
| 2015/0124826 | A1 | 5/2015 | Edsall et al. | |
| 2015/0127701 | A1* | 5/2015 | Chu | H04L 45/22 709/201 |
| 2015/0188722 | A1* | 7/2015 | Bhagavathiperumal | H04L 12/1886 370/235 |
| 2016/0285932 | A1* | 9/2016 | Thyamagundalu | H04L 69/324 |
| 2016/0359878 | A1* | 12/2016 | Prasad | G06F 3/04847 |
| 2017/0026266 | A1* | 1/2017 | Krutsch | H04L 43/0817 |
| 2017/0244630 | A1* | 8/2017 | Levy | H04L 43/0811 |
| 2018/0026872 | A1 | 1/2018 | Manthiramoorthy et al. | |

(Continued)

*Primary Examiner* — Peter G Solinsky
(74) *Attorney, Agent, or Firm* — Merchant & Gould P.C.

(57) ABSTRACT

In one illustrative example, an IP network media data router includes a spine and leaf switch architecture operative to provide IP multicast delivery of media data from source devices to receiver devices without the overhead communication with a controller. The architecture can include K spine switches, K sets of L leaf switches, M data links between each leaf switch, and a plurality of bidirectional data ports connected to each leaf switch for a guaranteed non-blocking IP multicast delivery of data. A deterministic hash function a used on both the first hop router and the last hop router to ensure the same spine node is selected for flow stitching. Accordingly, without the extra communication with a centralized controller, the right spine for establishing a multicast flow can be chosen using the deterministic hash function and the distributed resource information stored on each node.

19 Claims, 10 Drawing Sheets

(56) References Cited

U.S. PATENT DOCUMENTS

| | | | |
|---|---|---|---|
| 2018/0041578 A1* | 2/2018 | Lee | H04L 47/70 |
| 2018/0091473 A1* | 3/2018 | Wijnands | H04L 65/4076 |
| 2019/0014033 A1* | 1/2019 | Keesara | H04L 45/12 |
| 2019/0097944 A1* | 3/2019 | Kotalwar | H04L 12/185 |

* cited by examiner

METHODS AND APPARATUSES FOR NON-BLOCKING IP MULTICAST DELIVERY OF MEDIA DATA IN A MULTI-SPINE NETWORK

TECHNICAL FIELD

The present disclosure relates generally to methods and apparatuses for providing non-blocking IP multicast delivery of media data, and more particularly, to methods and apparatus for distributed selection of nodes servicing the non-blocking multicast in a multi-spine network.

BACKGROUND

Conventional live broadcast production uses serial digital interface (SDI) based technology for the transportation of video and audio traffic. The cross-bar switches used in the SDI technology have scalability issues. As such, the industry has moved away from the SDI based technology and sought to replace the crossbar switches with a network of IP switches in fabric-based spine-leaf topology. Some existing spine-leaf architectures include multiple spine nodes for scalability. Such spine-leaf architectures often include a controller for node selection and bandwidth management. Due to the extra communication with the controller for node selection and bandwidth management, the controller-based solutions in a multi-spine network typically have high latency. As multimedia applications are highly sensitive to flow provisioning latency, existing controller-based multi-spine solutions struggle to meet the low latency expectation.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
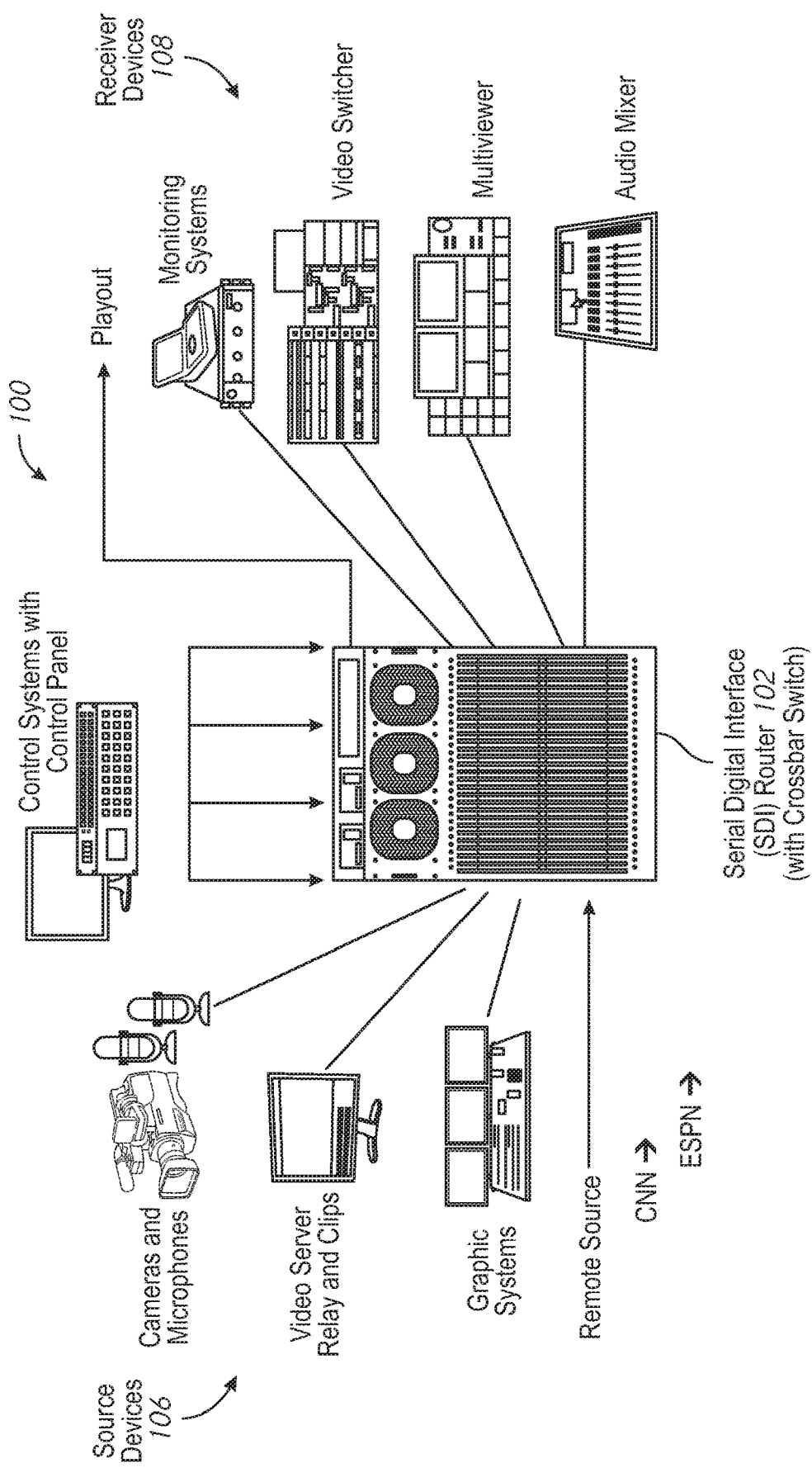
FIG. 1 is an illustration of a media delivery system using a serial digital interface (SDI) router having a crossbar switch.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Methods and apparatuses for providing a non-blocking IP multicast delivery of data in a multi-spine network without a controller are described herein. The methods and apparatuses of the present disclosure are suitable for use in the delivery of data comprising media data (e.g., video) context, and more specifically, video for live studio broadcast production context.

In one illustrative example, an IP network media data router can include multiple spine nodes in a spine-leaf switch architecture (i.e., a spine-leaf configuration) operative to provide IP multicast delivery of data from source devices to receiver devices. The spine-leaf switch architecture can include: K spine switches (where e.g., K=2, 3, or 4), K sets of L leaf switches; M data links between each leaf switch and each spine switch where each data link is provided with a maximum link bandwidth of $BW_L$; and a plurality of bidirectional data ports (e.g., for source and receiver connections) connected to each leaf switch.

In some embodiments, a source stream associated with a multicast to a group starts first on a first hop router. The first hop router is a leaf node connectable to a source device of the multicast. The first hop router selects a preferred spine node (also known as a home spine node) from multiple spine nodes using a deterministic hash function. In some embodiments, the deterministic hash function calculates a spine node index based on a source address S associated with the source device, a group address G associated with the group, and/or the number of spines, e.g., (S+G) % number of spines. Having selected the preferred spine node, the first hop router sends a register request (e.g., a protocol independent multicast (PIM) register message) to the preferred spine node. Upon receiving the register request, the preferred spine node determines whether it has available resources (e.g., bandwidth, ports, and/or memory etc.) for servicing the multicast. In accordance with a determination that the preferred spine node has available resources for servicing the multicast, e.g., by looking up a bandwidth table stored on the preferred spine node, the preferred spine node sends the first hop router a multicast join request (e.g., a PIM source specific multicast message (PIM ASM or SSM)). Upon receiving the multicast join request, the first hop router routes multicast traffic to the preferred spine node.

In some embodiments, a receiver stream associated with a multicast to a group starts first on a last hop router. The last hop router is a leaf node connectable to a receiver device of the multicast. The last hop router uses the same deterministic hash function to select a preferred spine node from the multiple spine nodes and determines whether the last hop router has available resources to connect to the preferred spine in order to service the multicast. In case the last hop router has resources (e.g., bandwidth) to accommodate the multicast, e.g., by looking up a bandwidth table stored on the last hop router, the last hop router sends a join request (e.g., a PIM ASM or SSM join message) to the preferred spine node. Upon receiving the join request, the preferred spine node stitches the multicast flow from a source of the multicast. In some embodiments, the preferred spine node stitches the multicast flow by first determining whether it has available resource (e.g., bandwidth, ports, and/or memory etc.) to connect to a first hop router, which is connected to the source of the multicast. In accordance with a determination that the preferred spine node has available resource to connect to the first hop router (e.g., by looking up a bandwidth table stored on the preferred spine node), the preferred spine sends a join message (e.g., PIM ASM or SSM join message) to the first hop router. Upon successful flow provisioning, the last hop router receives the multicast traffic from the preferred spine node.

Advantageously, the router can be configured to provide a (e.g., guaranteed) non-blocking IP multicast delivery of media data without the overhead communication associated with a controller, such that many or any traffic flow pattern or combination can be achieved. Since the same hash function is used on both the first hop router and the last hop router, the lookup for the preferred spine node using the deterministic hash function based on (S, G) would result in the same spine node for flow stitching. In some embodiments, a failover mechanism (e.g., a round robin selection of another spine node based on a spine index associated with each spine node) is executed on both the first hop router and the last hop router in order to select a next best spine node, in case the preferred spine node does not have available resources for flow stitching. Since the same failover mechanism is executed on both the first hop router and the last hop router, the same spine node would be selected as the next best spine node for flow stitching. Accordingly, without the extra communication associated with a centralized controller, a spine node for establishing a multicast flow can be chosen using the deterministic hash function and the distributed resource information stored on each node.

Example Embodiments

Referring to FIG. 1, a system 100 for delivery of media data using a serial digital interface (SDI) router 102 is shown in accordance with some embodiments. The system 100 with the SDI router 102 can be used for communicating media signals, such as video signals. As shown, a plurality of source devices 106 can connect to the SDI router 102 in order to send media signals. In some embodiments, the plurality of source devices 106 include cameras and microphones, video server relay and clips, graphic systems, remote sources, television broadcast sources (e.g., CNN, ESPN television signal sources), and/or any other suitable source devices. A plurality of receiver devices 108 can connect to the SDI router 102 in order to receive media signals from any one of the plurality of sources devices 106. As illustrated, the plurality of receiver devices 108 can include monitoring systems, video switches, multi-viewers, audio mixers, and/or any other suitable receiver devices.

The SDI router 102 includes a crossbar switch having multiple input and output lines that form a crossed pattern of interconnecting lines between which a connection can be established. An input line can be "tapped" to send media signals from one of the source devices 106 so that the media signals can be received by multiple receiver devices 108 on multiple output lines. Note that the crossbar switch is not easily scalable or expandable, and the input and output lines of the crossbar switch have fixed bandwidths.

Accordingly, there is a need for an IP network data router for the media data delivery, especially for use in the replacement of SDI technology utilizing the crossbar switches. There is a further need for an IP network media data router to provide non-blocking IP multicast delivery of media data (e.g., guaranteed non-blocking delivery), such as for video for live studio broadcast production.

Figure 2:
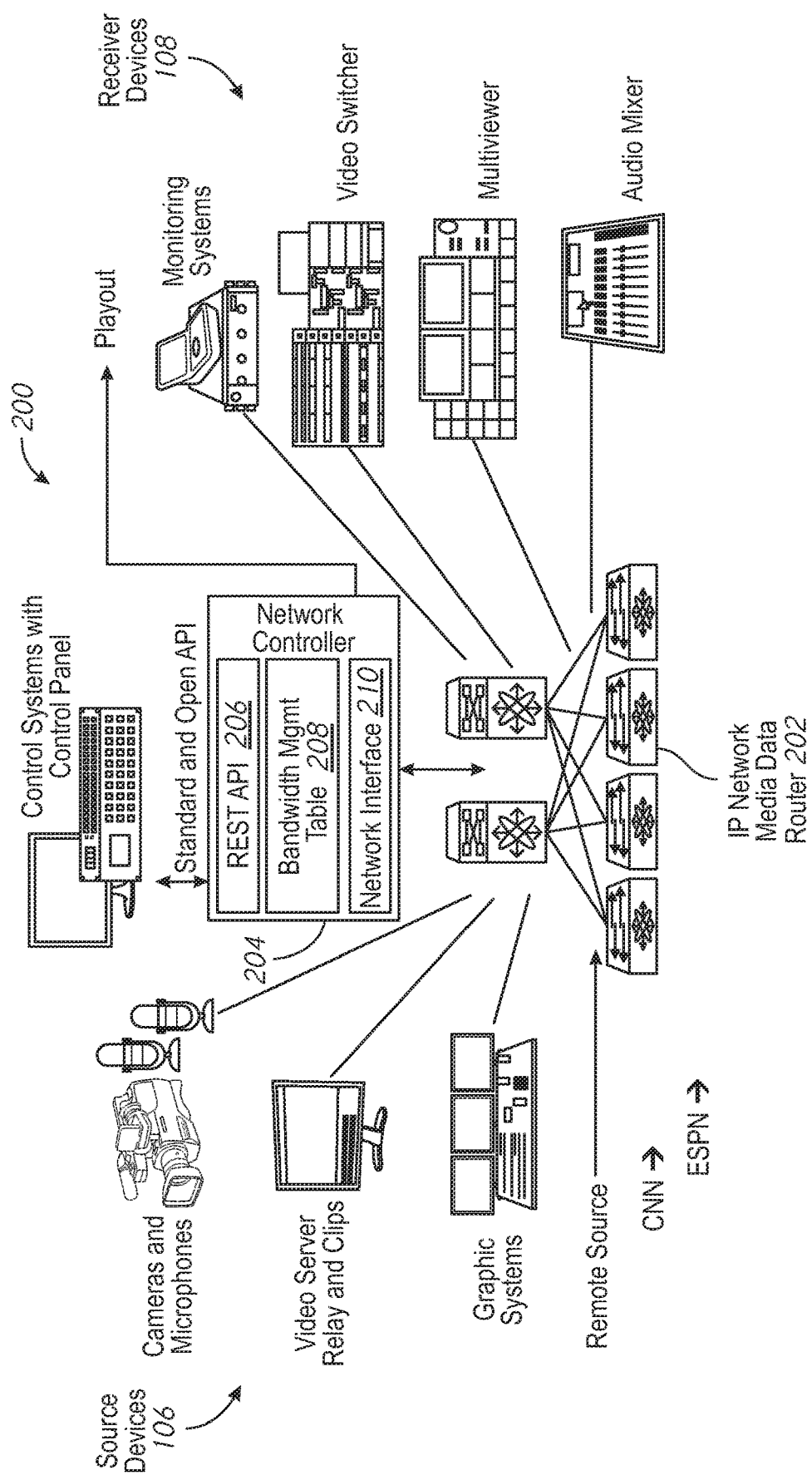
FIG. 2 is an illustration of a non-blocking IP multicast media delivery system using an IP network media data router.

FIG. 2 is an illustration of a non-blocking IP multicast media delivery system 200 using an IP network media data router 202 in place of a crossbar. The IP network media data router 202 can be operative to provide IP multicast delivery of media data from the source devices 106 to the receiver devices 108. The IP network media data router 202 shown in FIG. 2 replaces the SDI 102 shown in FIG. 1. Elements common to FIGS. 1 and 2 include common reference numbers, and the differences between FIGS. 1 and 2 are described herein for the sake of brevity.

In some embodiments, the source devices 106 connect to the router 202 in order to send media data (e.g., video data) via IP multicast delivery, and the receiver devices 108 connect to the router 202 in order to receive the media data via the IP multicast delivery from any one of the sources devices 106. As shown in FIG. 2, in some embodiments, a network interface 210 of the network controller 204 provides connectivity between the network controller 204 and the router 202. In some embodiments, the network controller 204 controls one or more control systems with control panel via an application programming interface (API) (e.g., a Representational State Transfer or REST API 206).

Media applications are highly sensitive to flow provisioning latency. In a multi-spine architecture, a controller-based solution as shown in FIG. 2 may not meet the latency requirement. For example, the controller 204 may include a bandwidth management table 208 that tracks the bandwidth allocation in the IP network. The flow provisioning in the network with the central controller 204 would involve inquiring the controller 204 for the information stored in the bandwidth management table 208, and based on the information selecting a spine and a link for the flow. As such, the extra communication with the controller 204 introduces high latency.

Accordingly, there is a need for a multi-spine network without a controller to provide a non-blocking IP multicast delivery of media data, e.g., guaranteed non-blocking delivery of video for live studio broadcast production. The node selection methods and apparatuses described herein in accordance with various embodiments provide non-blocking multicast to IP fabric for media delivery without the need for a centralized controller. The distributed device and system thus reduces provisioning overhead and meets the media industry latency expectation.

Figure 3:
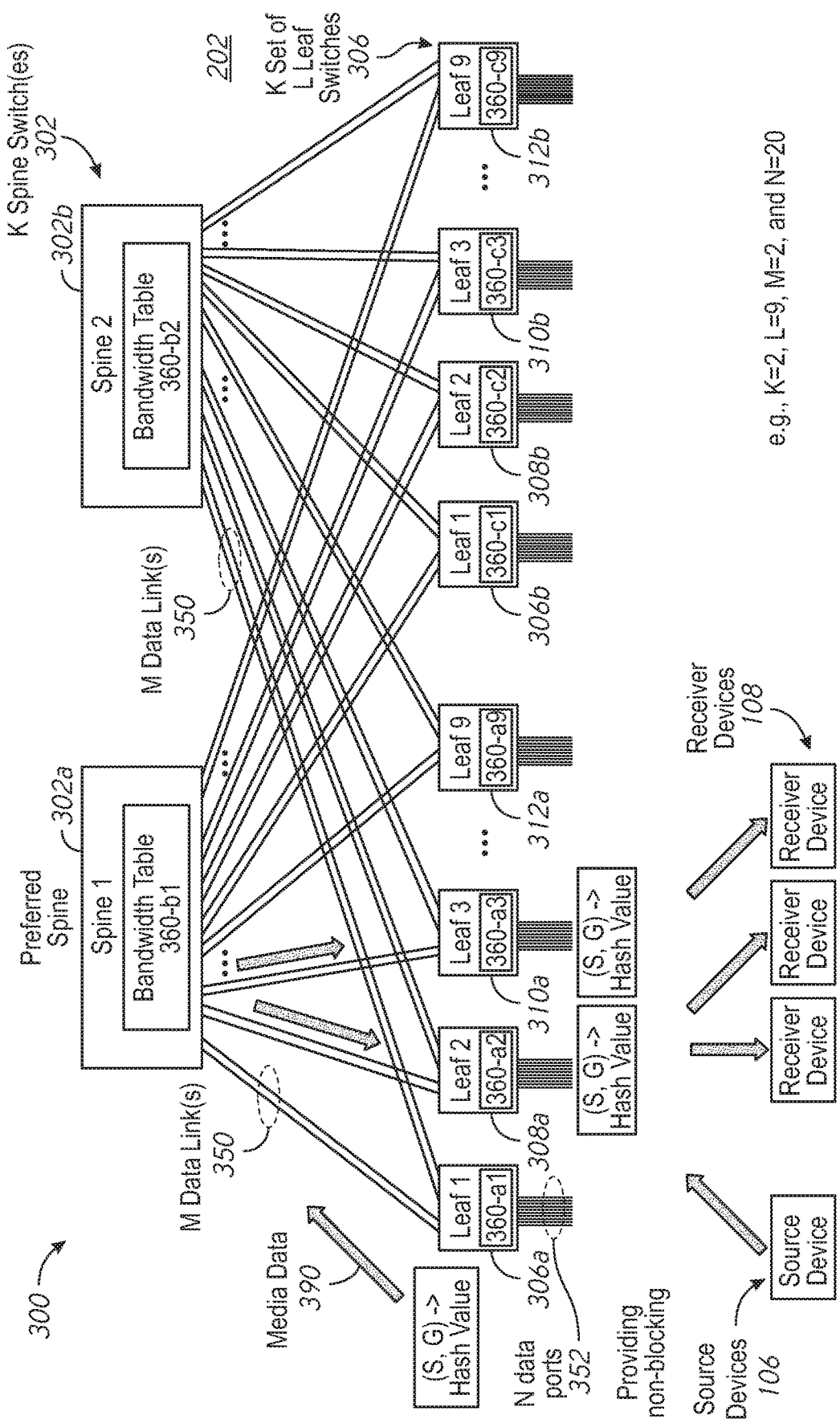
FIG. 3 is an example of a spine-leaf switch architecture of an IP network media data router according to some embodiments of the present disclosure.

FIG. 3 is an exemplary spine-leaf switch network 300 of the IP network media data router 202 according to some embodiments. The spine-leaf switch network 300 of the router 202 in FIG. 3 is operative to provide guaranteed non-blocking IP multicast delivery of media data from the source devices 106 to the receiver devices 108. To provide IP multicast delivery, the spine-leaf switch architecture 300 may operate with use of a multicast protocol, such as Internet Group Management Protocol (IGMP) or other suitable protocols.

As illustrated in FIG. 3, the IP network 300 includes K spine switches 302 (also known as spine nodes 302), e.g., spine switch 302a and spine switch 302b. The IP network 300 also includes K sets of L leaf switches (also known as leaf nodes), e.g., leaf switches 306a, 308a, 310a through 312a for a total of 9 leaf switches in the first set, and leaf switches 306b, 308b, 310b through 312b for a total of 9 leaf switches in the second set shown in FIG. 3. In some implementations, the leaf switches 306a, 308a, 310a through 312a for a total of 9 leaf switches and the leaf switches 306b, 308b, 310b through 312b for a total of 9 leaf switches are considered equal. As such, there is no set in the topology as shown in FIG. 3. Additionally, the IP network 300 includes M data links 350 between each leaf switch and each spine switch and a plurality of bidirectional data ports 352 (i.e., for source and receiver connections) connected to each leaf switch. For example, the IP network 300 has the settings of K=2; L=9; and M=2. Each one of the data links 350 is configured or set with a maximum link bandwidth value $BW_L$ in accordance with some embodiments. In some embodiments, the router 202 is configured and/or specified with a maximum N number of the bidirectional data ports 352 for guaranteed non-blocking IP multicast delivery of data at a maximum port bandwidth of $BW_P$, where N is a function of K, $BW_L$, and $BW_P$. For example, in FIG. 3, N=20 for the guaranteed non-blocking delivery of media data with 2 spine switches, $BW_L$ of 100 Gbps, and $BW_P$ of 10 Gbps.

In some embodiments, the source devices 106 and receiver devices 108 can be connected to any of the bidirectional data ports 352. Note that although the data ports 352 are bidirectional, their use in practice is often asymmetrical (i.e., one-way, depending on whether the connected device is a source or a receiver). Also note that in practice, the number of receiver devices 108 connected to bidirectional data ports 352 may far exceed the number of source devices 106 connected to bidirectional data ports 352.

To illustrate the basic approach and use in relation to FIG. 3, one of the source devices 106 with a source address S sends media data to a group through one of the bidirectional data ports 352 of leaf switch 306a for an IP multicast. The IP multicast communication enables a host to send IP packets to a group of hosts within the IP network 300. To send information to a specific group, the IP multicast communication uses a form of IP destination address, e.g., an IP multicast group address G. Both the source address S and the IP multicast group address G are specified in the packet traveling through the IP network 300, e.g., (S, G) in the destination address portion of the packet.

In some embodiments, connected to the source device 106 in this multicast, the leaf switch 306a is the first hop router. The first hop router 306a selects a spine switch, e.g., the spine switch 302a as the preferred spine switch (also known a preferred spine node), based on a hashing value of (S, G) and sends the IP multicast of media data 390 to the spine switch 302a. Two of the receiver devices 108 joining the IP multicast group G receive the media data 390 via leaf switch 308a, and another one of the receiver devices 108 joining the IP multicast group G receives the media data 390 via the leaf switch 310a as shown. As such, the leaf switches 308a and 310a are last hop routers in this multicast.

In some embodiments, the last hop routers 308a and 310a run the same hashing calculation based on (S, G) to select the same spine switch 302a as the preferred spine switch in order to receive the media data 390. The spine switch 302a stitches the flow and forward the media data 390. The media data 390 then travels down to the receiver devices 108 via the last hop routers 308a and 310a.

Different from the architecture 200 shown in FIG. 2, the IP network 300 does not have a centralized network controller. Instead of using the bandwidth management table 208 included in the network controller 204 for spine node selection and bandwidth allocation, the IP network 300 uses the deterministic hash function for spine selection and distributes the bandwidth management function to each switch. For example, each spine switch has its own view of the network bandwidth allocation, e.g., the first spine switch 302a includes a bandwidth table 360-b1 and the second spine switch 302b includes a bandwidth table 360-b2. Likewise, each leaf switch has its own view of the network bandwidth allocation, e.g., the nine leaf switches 306a, 308a, 310a . . . 312a in the first set of leaf switches includes nine network bandwidth tables 360-a1, 360-a2, 360-a3 . . . 360-a9, and the nine leaf switches 306b, 308b, 310b . . . 312b in the second set of leaf switches includes nine network bandwidth tables 360-c1, 360-c2, 360-c3 . . . 360-c9, with each network bandwidth table on one respective leaf switch. With the bandwidth information distributed on each switch, the IP network 300 reduces the overhead of communicating with a centralized controller for spine node selection and bandwidth allocation.

Figure 4:
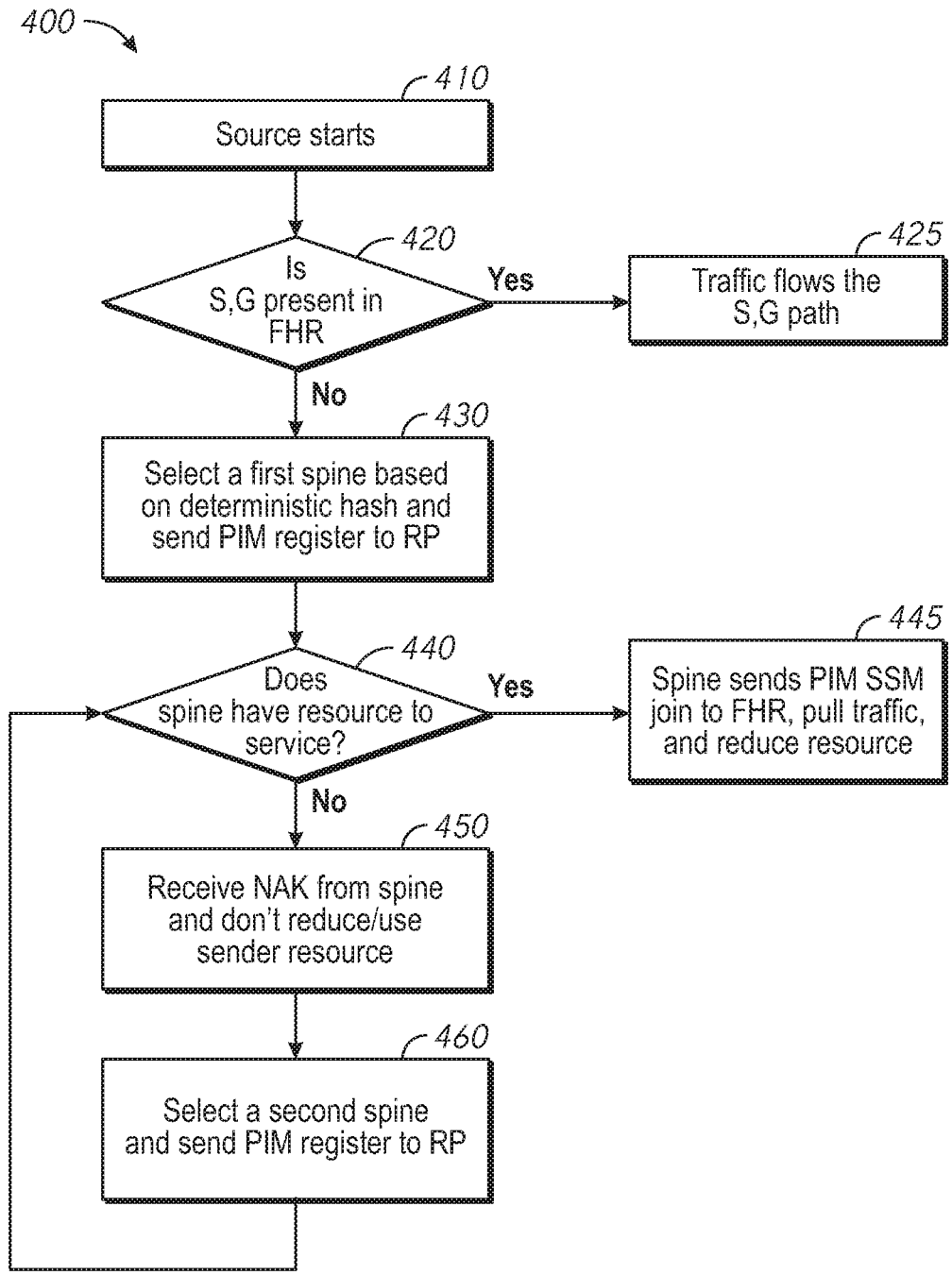
FIG. 4 is a flowchart illustrating a method of operation of a first hop router for a (e.g., guaranteed) non-blocking IP multicast delivery of media data according to some embodiments of the present disclosure.
Figure 5A:
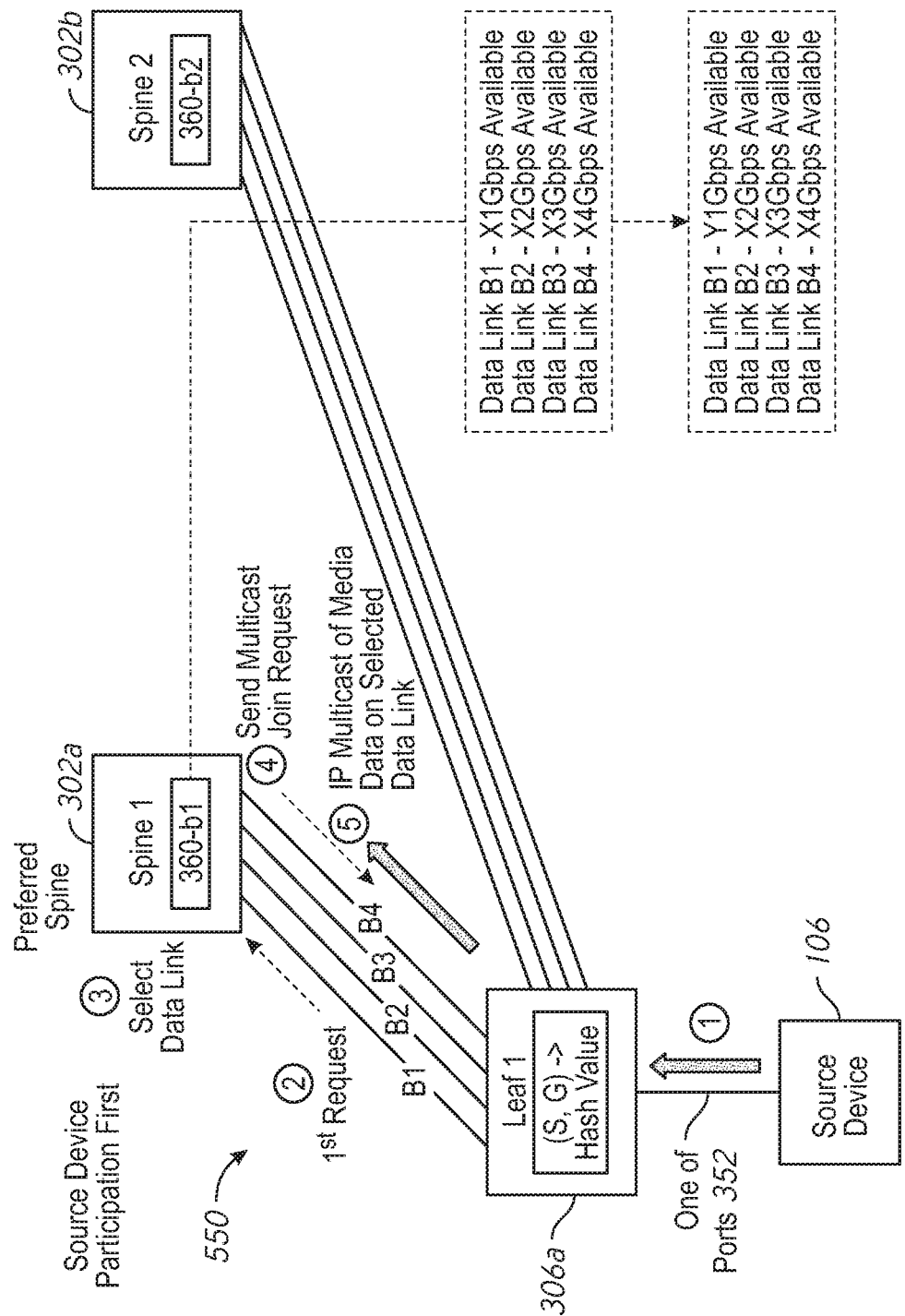
FIGS. 5A-5B are process flow diagrams for describing the method of operation of a first hop router corresponding to the flowchart of FIG. 4.
Figure 5B:
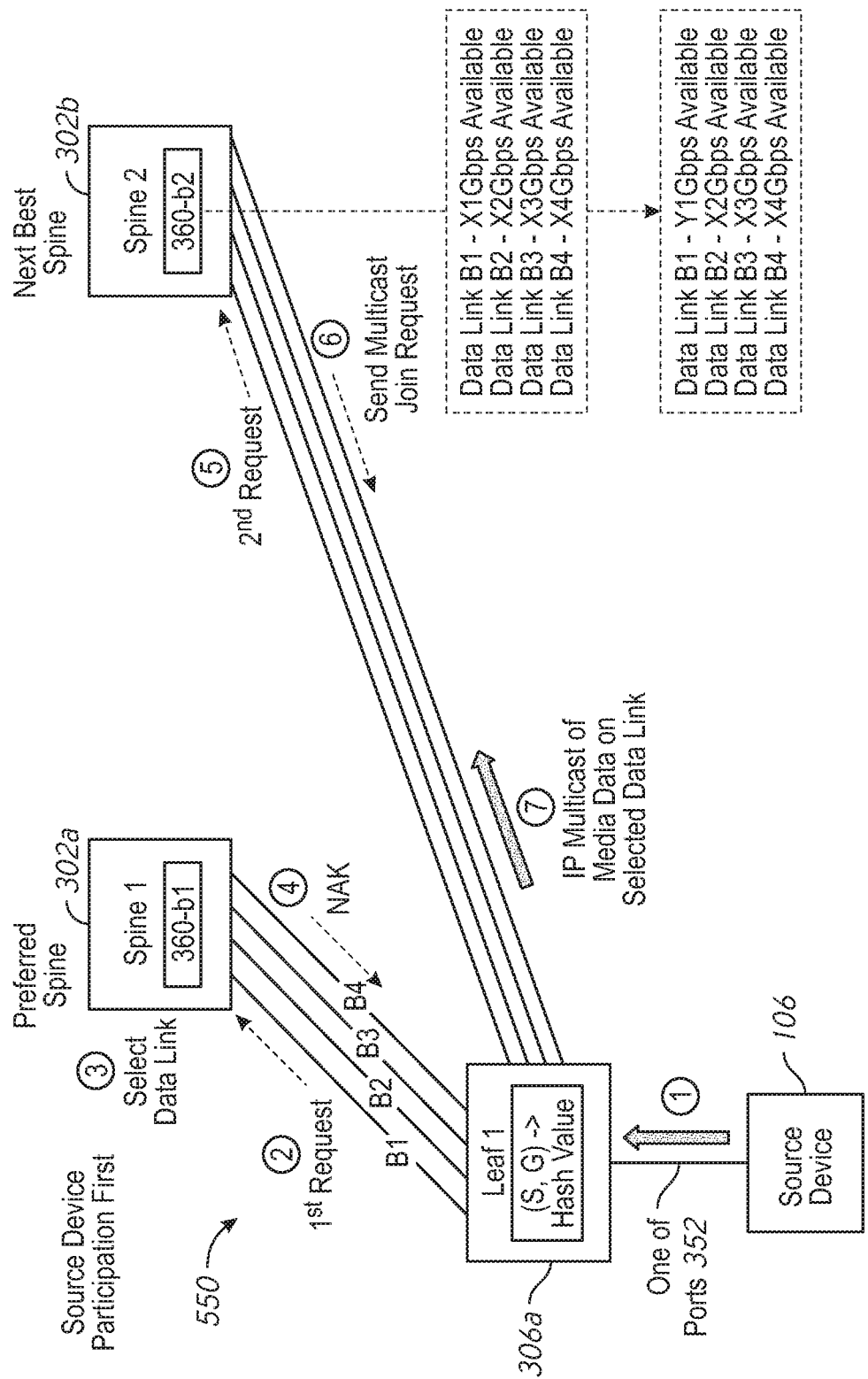

FIG. 4 is a flowchart illustrating a method 400 for providing a (e.g., guaranteed) non-blocking IP multicast delivery of media data according to some embodiments. In some embodiments, the method 400 is performed at a first hop router (e.g., the leaf switch 306a in FIG. 3) connectable to multiple spines in a network having a spine-leaf architecture (e.g., the network 300 in FIG. 3). The method 400 illustrates an IP multicast with a source stream starting first on the first hop router. Relatedly, FIGS. 5A and 5B are process flow diagrams for describing the method 400. The method 400 will be described in combination with the process flow diagrams shown in FIGS. 5A and 5B.

Beginning at a start block 410 of FIG. 4, the first hop router receives a multicast request from a source (e.g., the source device 106 in FIG. 3). For example, one of the source devices 106 sends media data through one of the bidirectional data ports 352 of the first hop router for an IP multicast to a group. In some embodiments, the source device 106 is associated with a source address S and the group is associated with a group address G, e.g., (S, G) in the destination address portion of the packet. See reference point (1) in FIGS. 5A and 5B. In some embodiments, the source device 106 sends the multicast request from the source device 106 along with the multicast data. In some embodiments, the source device 106 sends the multicast request from the source device 106 in a separate message.

Continuing with the method 400, as represented by block 420, the first hop router determines whether a record for the multicast represented by (S, G) is already present in the first hop router. In other words, the first hop router determines whether a network path has already been established for the multicast. In case the first hop router already has a record for the multicast ("Yes" path from block 420), the first hop router directs the multicast traffic following the existing path, as represented by block 425. On the other hand, with reference to block 430, if no preexisting path exists for the multicast represented by (S, G) on the first hop router ("No" path from block 420), the first hop router selects a first spine node (also known as a preferred spine node) from the multiple spine nodes using a deterministic hash function based on at least the source address and the group address (S, G). Also, as represented by block 430, the first hop router sends a first request (e.g., a protocol independent multicast (PIM) register message) to the first preferred spine node. In some embodiments, the first request causes the preferred spine node to determine whether or not the preferred spine node has available resource (e.g., bandwidth, ports, memory etc.) for servicing the multicast request. The determination of the resource by the preferred spine node is represented by block 440 in FIG. 4.

For example, the deterministic hash function calculates a spine node index as the remainder after division of the summation of (S+G) by the number of spine nodes, e.g., (S+G) % number of spines. In FIGS. 5A and 5B, using the deterministic hash function of (S+G) % 2, the spine 302a is first selected by the first hop router 306a as the preferred spine node. Upon selecting the preferred spine node 302a, the first hop router 306a sends a first request to the preferred spine node 302a, e.g., a PIM register message. See reference point (2) in FIGS. 5A and 5B. In some embodiments, the spine node 302a serves as a rendezvous point (RP). In some embodiments, the spines 302 in the network 300 have the same RP address on a loopback interface. Upon receiving the PIM register message from the first hop router 306a, the preferred spine node 302a looks in its bandwidth table 360-b1 in order to determine whether any link among the datalinks B1, B2, B3, and B4 is available to service the multicast. See reference point (3) in FIGS. 5A and 5B.

Referring back to FIG. 4, as represented by block 445, in case the preferred spine node has available resource (e.g., bandwidth, ports, memory, etc.) to service the multicast request ("Yes" path from block 440), the first hop router routes traffic associated with the multicast request to the preferred spine node. In some embodiments, flow policies are provisioned to dictate the parameters for a given multicast group, e.g., bandwidth, QoS, etc. Upon encountering incoming source traffic from the source device 106, the first hop router uses the flow policies to choose the best interface for sending traffic to the chosen spine node with guaranteed bandwidth. In some embodiments, the first hop router pulls or pushes traffic associated with the multicast request. Upon successfully receiving traffic from the first hop router, the selected spine node reduces its available resource (e.g., subtracting bandwidth consumed by the multicast from its available bandwidth) in order to keep account of resource utilization. On the other hand, in case the selected spine node does not have available resources servicing the multicast request ("No" path from block 440), as represented by block 450, the selected spine node ignores the PIM register message from the first hop router (e.g., sends a NAK to the first hop router) and does not update its resource table.

In some embodiments, as represented by block 460, upon receiving the NAK from the selected spine node, the first hop router executes a failover procedure by selecting a second spine node (e.g., a next best spine node) that is different from the first spine node. Upon selecting the second spine node, the first hop router sends a second request (e.g., a PIM register message) to the second spine node. The method 400 then circles back to the portion of the method represented by block 440, wherein it is determined whether or not the newly selected spine node has available resource servicing the multicast request.

For example, as shown by reference point (4) in FIG. 5A, in accordance with a determination that the preferred spine node 302a has available resources (e.g., bandwidth) servicing the multicast request, the preferred spine node 302a sends a PIM join message (e.g., a PIM source specific multicast message (PIM ASM or SSM)) to the first hop router 306a. Subsequently, as shown by reference point (5) in FIG. 5A, the preferred spine node 302a starts pulling traffic associated with the multicast request from the first hop router 306a. In some embodiments, as shown in FIG. 5A, upon successful pulling the traffic, the spine node 302a updates its bandwidth table, e.g., updating the bandwidth value of X1 Gbps stored in the bandwidth management table 360-b1 to bandwidth value of Y1 Gbps.

In contrast, as shown by reference point (4) in FIG. 5B, in accordance with a determination that the preferred spine node 302a does not have available resources (e.g., bandwidth) servicing the multicast request, the preferred spine node 302a does not update its bandwidth management table 360-b1 and sends a NAK to the first hop router 306a. Upon receiving the NAK, the first hop router 306a selects a different spine node 302b as the next best spine node and sends a second request (e.g., a PIM register message) to the next best spine node 302b, as shown by reference point (5) in FIG. 5B. In accordance with a determination that the next best spine node 302b has available resources (e.g., bandwidth) servicing the multicast request, the next best spine node 302b sends a PIM join message (e.g., a PIM source specific multicast message (PIM ASM or SSM)) to the first hop router 306a. See reference point (6) in FIG. 5B. Subsequently, as represented by reference point (7) in FIG. 5B, the next best spine node 302b starts pulling traffic associated with the multicast request from the first hop router 306a and updates its bandwidth table, e.g., reducing the available bandwidth value of X1 Gbps stored in the bandwidth management table 360-b2 by the bandwidth associated with the multicast.

In some embodiments, the next best spine node 302b is selected according to a failover mechanism, e.g., in a round robin fashion from the spine nodes in the network where each spine node is associated with a spine index. For example, the first hop router calculates a second index associated with the second spine node by shifting a first index associated with the first spine node by a predetermined offset. In an exemplary multi-spine network that has three spines, for example, when the first spine node does not have enough bandwidth for the multicast, the second spine node can be selected by incrementing the index associated with the first spine by one. Continuing this example, when the third spine node does not have enough bandwidth for the multicast, the index associated with the third spine node increments and the first spine is selected as the next best spine. It should be noted, that the predefined offset can be more than one, e.g., 2 or 3 etc. In some implementations, once possible spines have been tried and if they reply with NAKs, on coming back to the preferred spine, the process stops, and the flow is left unprovisioned. In some implementations, the failover mechanism periodically executes and retries the provisioning of such flows.

The method 400 described above in combination with the process flow diagrams in FIGS. 5A and 5B illustrates starting an IP multicast stream from the source. Though not shown in FIGS. 4 and 5A-5B, in some embodiments, when no receiver has requested to join the multicast, the selected spine node sends a prune request (e.g., a PIM-SSM prune message) to the first hop router indicating that the spine will stop forwarding traffic associated with the multicast. In some embodiments, the spine node sends the prune request prior to pulling the traffic from the first hop router. In some embodiments, the spine node sends the prune request after pulling the traffic from the first hop router for a predetermined amount of time.

The distributed bandwidth allocation and bandwidth management in accordance with embodiments described herein have a number of advantages. Existing controller-based multi-spine solutions as shown in FIG. 2 have high latency, which makes it difficult to meet the industry latency expectation for live broadcast production. In order to establish a multicast flow, nodes in the existing controller-based multi-spine solution would need to first query the bandwidth management table stored in connection with the controller, and then select a spine node and/or a link for flow stitching based on the information acquired from the controller. The additional communication with the controller introduces latency, and the centralized controller-based approach creates a bottleneck for traffic control.

In contrast, the distributed multi-spine solution in accordance with embodiments of method 400 described herein provides a non-blocking multicast solution to IP fabric for media delivery without a centralized controller. Instead of a centralized bandwidth management table, each node (including both the spine nodes and the leaf nodes) has its own network bandwidth table. The distributed network bandwidth table at each node contains bandwidth information of links connecting to the network. Thus, the distributed bandwidth management provides node selection and link selection without relying on a central controller.

Figure 6:
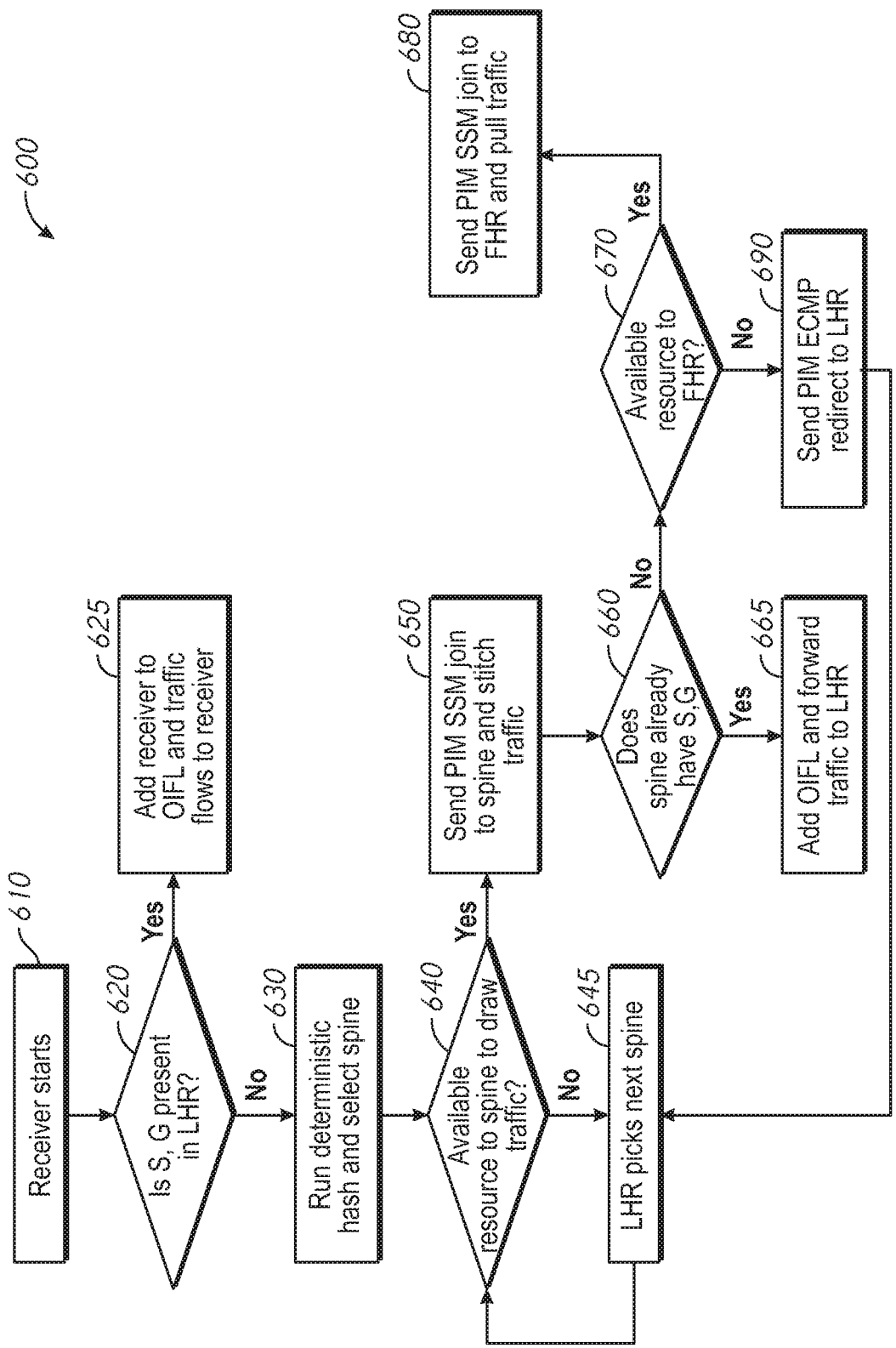
FIG. 6 is a flowchart illustrating a method of operation of a last hop router for a (e.g., guaranteed) non-blocking IP multicast delivery of media data according to some embodiments of the present disclosure.
Figure 7A:
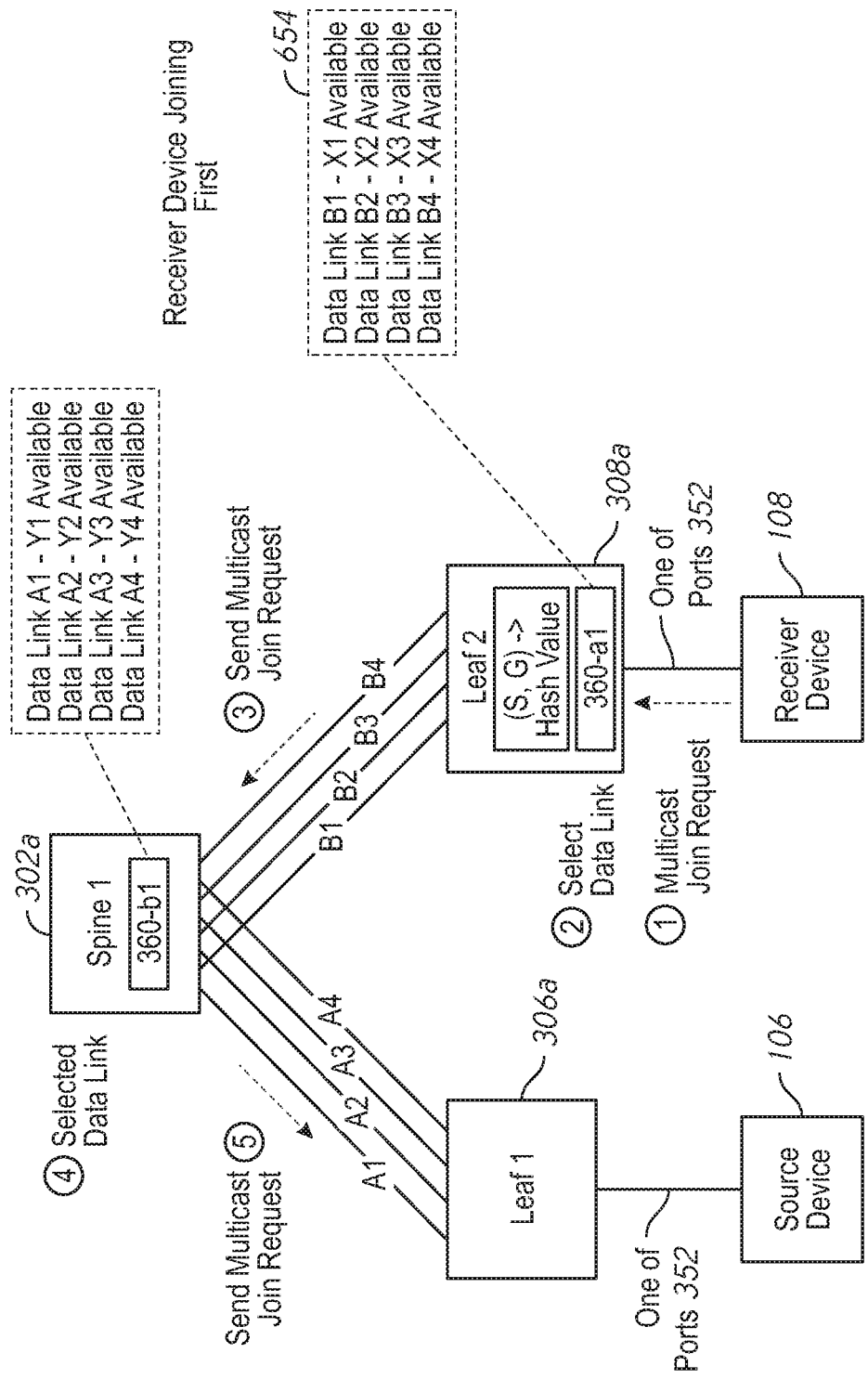
FIGS. 7A-7C are process flow diagrams for describing the method of operation of a last hop router corresponding to the flowchart of FIG. 6.
Figure 7B:
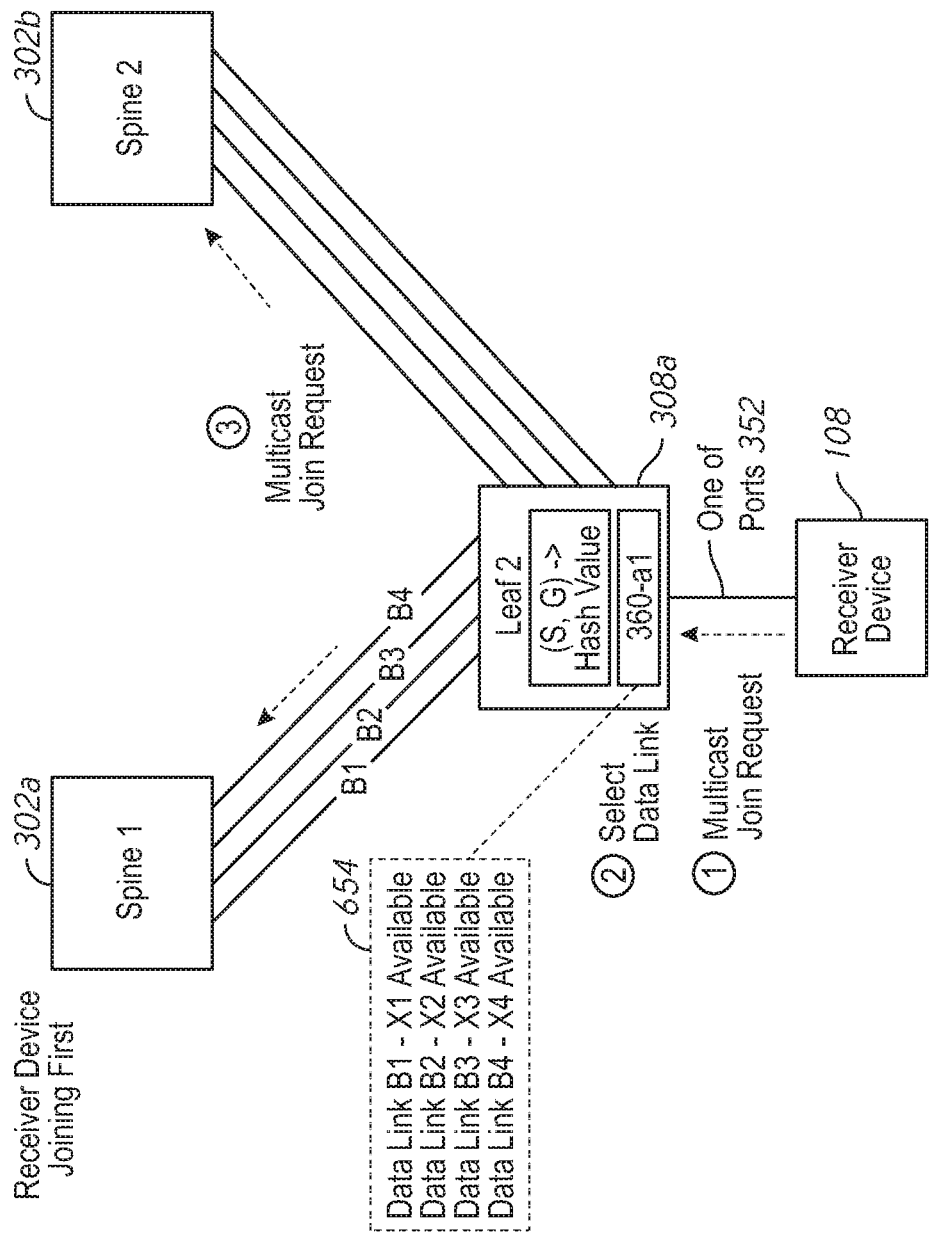
Figure 7C:
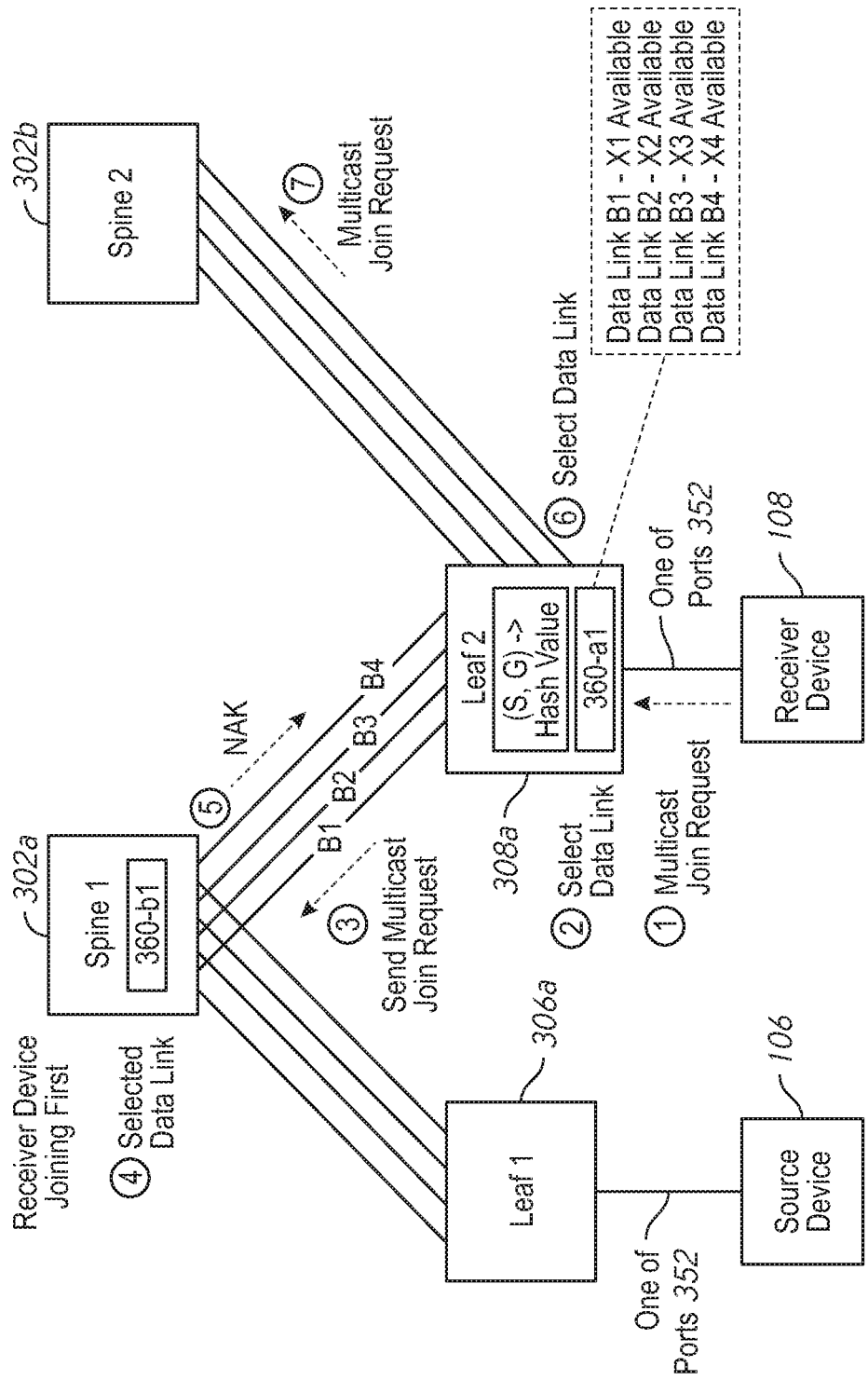

FIG. 6 is a flowchart illustrating a method 600 for providing a (e.g., guaranteed) non-blocking IP multicast delivery of media data according to some embodiments. In some embodiments, the method 600 is performed at a last hop router (e.g., the leaf switch 308a or 310a in FIG. 3) connectable to multiple spines in a network having a spine-leaf architecture (e.g., the network 300 in FIG. 3). The method 600 illustrates an IP multicast with a receiver stream starting first on the last hop router. Relatedly, FIGS. 7A-7C are process flow diagrams for describing the method 600. The method 600 will be described in combination with the process flow diagrams shown in FIGS. 7A-7C.

Beginning at a start block 610 of FIG. 6, the last hop router receives a multicast join request from a receiver (e.g., the receiver device 108 in FIG. 3), where the multicast join request specifies a source associated with a source address S and a group associated with a group address G. See reference point (1) in FIGS. 7A-7C illustrating the leaf node 308a as the last hop router receiving a multicast join request from the receiver device 108. In some embodiments, the multicast join request is or includes an Internet Group Management Protocol (IGMP) join message.

Continuing with the method 600, as represented by block 620, the last hop router determines whether a record for the multicast represented by (S, G) is already present in the last hop router, e.g., a record stored on the last hop router indicating a pre-existing network path for the multicast. In case the last hop router already has a record for the multicast ("Yes" path from block 620), the last hop router add the receiver to its output interface list (OIFL) and directs the traffic flow for the multicast to the receiver using the existing path, as represented by block 625. On the other hand, with reference to block 630, if no record exists for the multicast represented by (S, G) on the last hop router ("No" path from block 620), the last hop router selects a first spine node (also known as a preferred spine node) from the multiple spine nodes using a deterministic hash function based on at least the source address and the group address (S, G).

For example, the deterministic hash function calculates a spine node index as a remainder of the division of (S+G) by the number of spine nodes, e.g., (S+G) % number of spines. In FIG. 7A, using the deterministic hash function of (S+G) % 2, the spine node 302a is selected by the leaf node 308a (also known as the last hop router for the multicast) as the preferred spine node. In some embodiments, the same deterministic hash function is used by a first hop router connected to the source of the multicast traffic in order to select the first spine node. Thus, the same deterministic hash function is used by both the first hop router and the last hop router to ensure that the first hop router and the last hop router will meet at the same spine.

Still referring to FIG. 6, as represented by block 640, the last hop router determines whether or not the last hop router has available resources (e.g., bandwidth, ports, memory etc.) for servicing the multicast request. See reference point (2) in FIGS. 7A-7C. As shown in FIGS. 7A-7C, the last hop router 308a looks up its bandwidth management table 360-a1 and determines whether any link among the datalinks B1, B2, B3, and B4 is available from the last hop router 308a to the spine node 302a in order to draw the multicast traffic.

In case the last hop router 308a has available resources (e.g., bandwidth, ports, memory, etc.) connecting to the spine node in order to service the multicast request ("Yes" path from block 640), the last hop router sends a request (e.g., a PIM join message) to the selected spine and attempts to stitch the traffic, as represented by block 650. On the other hand, in case the last hop router 308a does not have available resources connecting to the spine node in order to service the multicast request ("No" path from block 640), the last hop router selects the next best spine, as represented by block 645. The method 600 then circles back to the portion of the method represented by block 640 for determining whether or not the last spine has available resources (e.g., bandwidth ports, memory, etc.) connecting to the selected spine in order to service the multicast request.

For example, as shown by reference point (3) in FIG. 7A, in accordance with a determination that the last hop node 308a has available resources (e.g., bandwidth) connecting to the spine node 302a for the multicast, the last hop router 308a sends a PIM join message (e.g., a PIM source specific multicast message (PIM ASM or SSM)) to the first hop router 306a. In contrast, as shown by reference point (3) in FIG. 7B, in accordance with a determination that the last hop router 308a does not have available resources (e.g., bandwidth) connecting to the spine node 302a for the multicast, the last hop router 308a selects a different spine node 302b as the next best spine node and sends a multicast join request (e.g., a PIM ASM or SSM message) to the next best spine node 302b.

Referring back to FIG. 6, as represented by block 660, the PIM ASM or SSM join message received by the spine node triggers a number of determinations on the selected spine. First, the selected spine determines whether the spine node already has a record for the multicast represented by (S, G). In case the selected spine node already has a record for the multicast ("Yes" path from block 660), the spine node adds the last hop router to its OIFL and forwards traffic to the last hop router. On the other hand, if the spine node does not have a record for the multicast represented by (S, G) ("No" path from block 660), the spine node determines whether it has resources (e.g., bandwidth, port, memory etc.) servicing the multicast. Second, in some embodiments, as represented by block 670, the spine node further determines whether it has available bandwidth to the first hop router that is connected to the source device. As represented by block 680, in accordance with a determination that the spine node has available resources to connect to the first hop router in order to service the multicast ("Yes" path from block 670), the spine node sends a multicast join message (e.g., a PIM ASM or SSM) to the first hop router and starts routing traffic from the first hop router to the last hop router. On the other hand, as represented by block 690, in accordance with a determination that the spine node does not have available resources to connect to the first hop router in order to service the multicast ("No" path from block 670), the spine node sends a message (e.g., an equal-cost multi-path (ECMP) redirect message) to the last hop router, which triggers the last hop router to select a different spine node servicing the multicast. Accordingly, the method 600 circles back to the portion of the method represented by block 645, where the last hop router selects the next best spine node.

For example, as represented by reference point (4) in FIGS. 7A and 7C, upon receiving the multicast join request from the leaf node 308a, the spine node 302a looks up its bandwidth management table 360-b1 and determines whether any link among the datalinks A1, A2, A3, and A4 connecting to the first hop router 306a are available to service the multicast. Subsequently, as represented by reference point (5) in FIG. 7A, based on a determination that the spine node 302a has sufficient bandwidth connecting to the first hop router 306a in order to service the multicast, the spine node 302a sends a multicast join request to the first hop router 306a and starts pulling traffic associated with the multicast request from the first hop router 306a and updates its bandwidth table 360-b1 to reflect the remaining available resources.

In contrast, as represented by reference point (5) in FIG. 7C, based on a determination that the spine node 302a does not have sufficient bandwidth connecting to the first hop router 306a in order to service the multicast, the spine node 302a sends a NAK (e.g., a PIM ECMP redirect). Upon receiving the message indicating the preferred spine node 302a cannot connect to the first hop router, as represented by reference point (6) in FIG. 7C, the last hop router resorts to a failover procedure, such as recalculating reverse path forwarding (RPF) and locating the next best spine 302b. In some embodiments, the second spine node 302b is selected in a round robin fashion from the spine nodes in the network as described above in connection with FIG. 5B. Further, based on the bandwidth table 360-a1 stored on the last hop node 308a, in accordance with a determination that the last hop router 308a has resources to connect to the next best spine node 302b, as represented by reference point (7) in FIG. 7, a multicast join request is sent from the last hop router 308a to the next best spine node 302b.

Note that the components and techniques shown and described in relation to the separate figures can indeed be provided as separate components and techniques, and alternatively one or more (or all of) the components and techniques shown and described in relation to the separate figures are provided together for operation in a cooperative manner.

While various aspects of embodiments within the scope of the appended claims are described above, it should be apparent that the various features of embodiments described above can be embodied in a wide variety of forms and that any specific structure and/or function described above is merely illustrative. Based on the present disclosure one skilled in the art should appreciate that an aspect described herein can be implemented independently of any other aspects and that two or more of these aspects can be combined in various ways. For example, an apparatus can be implemented and/or a method can be practiced using any number of the aspects set forth herein. In addition, such an apparatus can be implemented and/or such a method can be practiced using other structure and/or functionality in addition to or other than one or more of the aspects set forth herein.

It will also be understood that, although the terms "first," "second," etc. can be used herein to describe various elements, these elements should not be limited by these terms. These terms are only used to distinguish one element from another. For example, a first spine switch could be termed a second spine switch, and, similarly, a second spine switch could be termed a first spine switch, which changing the meaning of the description, so long as all occurrences of the "first spine switch" are renamed consistently and all occurrences of the second spine switch are renamed consistently. The first spine switch and the second spine switch are both spine switches, but they are not the same spine switch.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The invention claimed is:

1. A method comprising:
receiving a multicast request from a source to a group, wherein the source is associated with a source address and the group is associated with a group address;
selecting a first spine node of multiple spine nodes of a spine and leaf architecture using a deterministic hash function, wherein selecting the first spine node comprises determining, by a first hop router, a first spine node index using the deterministic hash function based on the source address, the group address, and a number of spine nodes in a network comprising a spine and leaf architecture, wherein the first spine node index is associated with the first spine node, and wherein a last hop router associated with a receiver uses a same deterministic hash function used for selecting the first spine node to select a last spine node for receiving traffic associated with the multicast request;
determining that the first spine node has an available resource in order to service the multicast request; and
routing the traffic associated with the multicast request to the first spine node upon receiving a multicast join request from the first spine node in accordance with determining that the first spine node has the available resource.

2. The method of claim 1, further comprising:
determining that a second spine node has available resource to the first hop router for the multicast request in response to determining that the first spine node does not have the available resource to the first hop router for the multicast request.

3. The method of claim 2 further comprising calculating a second spine node index associated with the second spine node by changing the first spine node index associated with the first spine node by a predetermined offset.

4. The method of claim 1, wherein a bandwidth table containing information associated with the available resource is stored on the first spine node.

5. The method of claim 4 further comprising updating the bandwidth table by deducting a bandwidth associated with the multicast request from the available resource.

6. The method of claim 1 further comprising receiving a prune request from the first spine node in accordance with a determination that no receiver has requested to join the group through the first spine node.

7. A method comprising:
selecting a first spine node of multiple spine nodes using a deterministic hash function, wherein selecting the first spine node comprises determining, by a last hop router, a first spine node index using the deterministic hash function based on a source address, a group address associated with a multicast, and a number of multiple spine nodes in a spine and leaf architecture, wherein the first spine node index is associated with the first spine node, and wherein a first hop router associated with a receiver uses a same deterministic hash function used for selecting the first spine node to select another spine node for sending a multicast request;
sending a first multicast join request to the first spine node in accordance with a first determination that the last hop router has available resource to the first spine node in order to service the multicast; and
receiving traffic associated with the multicast via the first spine node in accordance with a second determination that the first spine node has available resource servicing the multicast.

8. The method of claim 7 further comprising selecting a second spine node of the multiple spine nodes in accordance with the first determination that the last hop router does not have available resource to the first spine node for the multicast.

9. The method of claim 8 further comprising calculating a second spine node index associated with the second spine node by changing the first spine node index associated with the first spine node by a predetermined offset.

10. The method of claim 8, wherein selecting the second spine node is performed in response to receiving a redirect message from the first spine node in accordance with the second determination that the first spine node does not have available resource for the multicast.

11. The method of claim 7, wherein a bandwidth table containing information associated with the available resource is stored on the last hop router.

12. The method of claim 11 further comprising updating the bandwidth table by deducting a bandwidth associated with the multicast from the available resource.

13. The method of claim 7, wherein the second determination includes determining whether or not the first spine node has available resource to connect to a first hop router connected to a source corresponding to the source address, and the method further includes sending by the first spine node a second multicast join request to the first hop router.

14. A system comprising:
a plurality of spine switches;
a plurality of leaf switches;
a plurality of data links between each of the plurality of leaf switch and each of the plurality of spine switches switch; and
wherein a first leaf switch of the plurality of leaf switches is operative to:
receive a multicast request from a source to a group, wherein the source is associated with a source address and the group is associated with a group address;
select a first spine switch of the plurality of spine switches using a deterministic hash function, wherein the first leaf switch being operative to select the first spine switch comprises the first leaf switch being operative to determine a first spine node index using the deterministic hash function based on the source address the group address and a number of spine switches in the plurality of spine switches, the first spine node index corresponding to the first spine switch, and wherein a second leaf switch associated with a receiver uses a same deterministic hash function used for selecting the first spine switch to select a last spine node for receiving traffic associated with the multicast request,
determine that the first spine switch has available resource to service the multicast request, and
route the traffic associated with the multicast request to the first spine switch in response to determining that the first spine switch has the available resource.

15. The system of claim 14, wherein the first leaf switch is further operative to:
determine that a second spine switch, different from the first spine node, that has available resource for the multicast request in response to determining that the first spine switch does not have the available resource for the multicast request.

16. The system of claim 14 wherein the first leaf switch being operative to determine the second spine switch comprises the first switch being operative to determine a second spine node index associated with the second spine switch by changing the first spine node index associated with the first spine switch by a predetermined offset.

17. The system of claim 14, wherein a bandwidth table containing information associated with the available resource is stored on the first spine switch.

18. The system of claim 17, wherein the first leaf switch is further operative to update the bandwidth table by deducting a bandwidth associated with the multicast request from the available resource.

19. The system of claim 14 wherein the first leaf switch is further operative to receive a prune request from the first spine switch in accordance with a determination that no receiver has requested to join the group through the first spine switch.

* * * * *